United States Patent [19]

Buffa et al.

[11] Patent Number: 4,596,932

[45] Date of Patent: Jun. 24, 1986

[54] PORTABLE DOSIMETER

[75] Inventors: Alfonso Buffa; Richard Caley; Karl Pfaff, all of New York, N.Y.

[73] Assignee: Allied Memorial Hospital for Cancer & Diseases, New York, N.Y.

[21] Appl. No.: 495,371

[22] Filed: May 17, 1983

[51] Int. Cl.$^4$ .......................... G21F 5/00; H01J 47/02
[52] U.S. Cl. .................................. 250/374; 250/388; 250/515.1
[58] Field of Search ............... 250/374, 505.1; 357/84; 250/515.1, 388

[56] References Cited

U.S. PATENT DOCUMENTS

| 2,995,661 | 8/1961 | White | 250/388 |
| 3,148,280 | 9/1964 | Kleber et al. | 250/518.1 |
| 3,518,494 | 6/1970 | James | 357/40 |

OTHER PUBLICATIONS

J. Garrett Holt, Alfonso Buffa, David J. Perry, I-Chang Ma and Joseph C. McDonald, "Absorbed Dose Measurements Using Parallel Plate Polystyrene Ionization Chambers in Polystyrene Phantoms," *International Journal of Radiation Oncology, Biology Physics*, vol. 5, Nos. 11-12 (Nov.-Dec. 1979) pp. 2031-2038.

Primary Examiner—Alfred E. Smith
Assistant Examiner—Constantine Hannaher
Attorney, Agent, or Firm—Felfe & Lynch

[57] ABSTRACT

A dosimeter for measuring the intensity of high energy electron, photon, or other particle radiation has ion, electron, and radiation shields about at least respectively sensitive components of the dosimeter. The entire dosimeter, therefore, can be assembled as a unit and portably placed in the radiation to be measured. Ruggedness for this desirable partability is provided by the use in the dosimeter of a pancake ionization chamber which also eliminates the need to calibrate radiologically the dosimeter.

8 Claims, 2 Drawing Figures

PORTABLE DOSIMETER

BACKGROUND OF THE INVENTION

The invention relates to a portable dosimeter for indicating the intensity of radiation and, more particularly, high-intensity radiation used in medical therapies.

High-energy accelerators for producing high-energy electron, photon, and other particle beams are finding increasingly widespread uses, for example in medical radiation therapies. The intensity of the radiation from these accelerators varies over time for a number of well-known reasons. The intensity therefore must be checked periodically because many of the uses of the radiation require a highly-accurate radiation intensity. Medical radiation therapy, for example, requires that the dose of the radiation on the body target be determined precisely to be effective but not harmful.

In the past, high energy electron, photon, and other particle beams were used only in a few major institutions which had physics staffs capable of investigating the fundamental problems encountered in regulating the intensity of the high energy radiation. Today, however, high energy accelerators frequently are found in small institutions such as community hospitals. These institutions do not have physics staffs adequate for using the Faraday cup, the calorimeter, or the Fricke ionometric dosimeters which provide the basis for absolute dosimetry. In addition, these devices are cumbersome for the everyday calibration of high energy accelerators. Several protocols have therefore been developed for the dosimetry of high energy electron, photon, and other particle beams for routine application in the field. Most of these protocols recommend the use of ionometric methods of dosimetry using commercially available ionization chambers to calibrate the high energy accelerators.

Although the protocols serve to establish consistency in dosimetry methodology, various problems have become apparent in some of the protocols. Some of these problems arise from the design and use of the dosimeters which were developed for implementing the protocols. One problem is chamber and phantoms homogeneity. Another problem is the need to recalibrate known ionometric dosimeters periodically, for example about once a year. Regional calibration laboratories or the United States government National Bureau of Standards are used for recalibrating the dosimeters, but while the dosimeter is being recalibrated, it is not available for calibrating the high energy accelerator. Multiple dosimeters or careful scheduling are therefore required to keep the high energy accelerator available for desired, calibrated use.

One of the inventors named herein and others at the Department of Medical Physics, Memorial Hospital, New York, N.Y., developed a parallel plate or pancake ionization chamber for use in dosimetry which overcomes many of these problems. This pancake ionization chamber is described in detail in the *International Journal of Radiation Oncology, Biological Physics*, Volume v, pages 2031 to 2038, November–December, 1979.

In general, the pancake ionization chamber has a pair of parallel, graphite electrodes on polystyrene substrates precisely spaced from each other. By spacing the parallel electrodes precisely, the volume of the ionization chamber between the electrodes is fixed and determined precisely. The fixed, precise volume of the ionization chamber, determined both electrically and mechanically, eliminates the need for a periodical radiological recalibrating a dosimeter.

Among the problems which were not solved by the pancake ionization chamber described above were those of shielding the electronic circuitry of the dosimeter instrumentation from the effects of the high intensity radiation. The intensity of the radiation is intended to ionize a gas (air) in the pancake ionization chamber. As described in the publication, the ion chamber may be vented to the atmosphere to eliminate problems of maintaining a sealed cavity. If the radiation ionizes the air in the chamber, however, it also ionizes air adjacent to the chamber, and these ions can affect the electronic circuitry of the dosimeter. The radiation itself can also affect the dosimeter instrumentation, including, for example, many solid state devices which are known to be radiation sensitive.

SUMMARY OF THE INVENTION

It is therefore an object of invention to provide a dosimeter which is portable in the sense of being ready for use when transported to a source of high intensity radiation without exacting set-up by trained technicians and, more particularly, a portable dosimeter for use with high intensity photon and electron radiation in medical therapy.

To these ends, the invention provides a dosimeter which may be assembled as a unit and transported ready for use to various radiation sources. The dosimeter has a pair of facing, electrically-conducting, radiation-permeable electrodes spaced from each other forming a fixed, precisely-determinable volume of a gas which is ionizable by the radiation intensity which is to be indicated by the dosimeter. Appropriate electric potential supply and detection circuit devices are connected to the electrodes for detecting the electron charge transferred to the electrodes from the radiation-ionized gas. At least one of the components of the potential supply and detection circuit is sensitive to the radiation or ionization of air adjacent the component produced by the primary or secondary components of the beam impinging on the chamber and photon. The dosimeter therefore has an ion shield, an electron shield, and a radiation shield surrounding at least the respectively sensitive components of the dosimeter. The entire dosimeter from the radiation-detecting ionization chamber to a display for indicating a representation of the detected radiation intensity may therefore be assembled as a unit and transported into the radiation for indicating its intensity.

The unitary portability of the dosimeter is an important practical advantage. Many institutions now have multiple high energy accelerators which require calibration with the dosimeter. The portable unit of the invention can be carried easily to each of the accelerators, positioned for receiving the radiation from the accelerator, and the representation of the radiation intensity read from the unit without any assembly, connections, or additional shielding. Eliminating the need for auxiliary shielding, such as separating the dosimeter circuitry from the radiation detector with an umbilical connection, is particularly important because failure to separate the components properly can result in physical damage to the dosimeter, or even more seriously, an inaccurate representation of the radiation intensity which then may be inaccurately administered to a patient, potentially causing serious harm. The need for skilled technicians to set up the dosimeter properly is therefore significantly reduced with the portable unit of the invention.

The combination of the pancake ionization chamber with the shielding in the portable unitary dosimeter offers still further advantages. The pancake ionization chamber is physically rugged to withstand the shocks of portability. It is also temperature and pressure stable to allow use of the dosimeter under widely varying ambient conditions. Most importantly, however, the pancake ionization chamber does not require periodic calibration. Its use thus avoids the cost and scheduling problems of such calibrations and keeps the dosimeter continuously available for use.

The representation of the radiation intensity displayed by the portable dosimeter may be in volts or other units requiring conversion by known algorithms into radiation intensity units such as rads. The preferred embodiment of the invention, however, includes a microprocessor for converting the representation intensity into radiation-measurement units automatically. For this, the microprocessor is programmed with the known algorithm for converting the representation of the radiation intensity into radiation units and, preferably, several such algorithms selectable by switches on the portable dosimeter to adapt the portable dosimeter use with various radiation sources.

DESCRIPTION OF THE DRAWINGS

A preferred embodiment which is intended to illustrate, but not to limit the invention will now be described with reference to drawings in which.

DESCRIPTION OF THE PREFERRED EMBODIMENT

Figure 1:
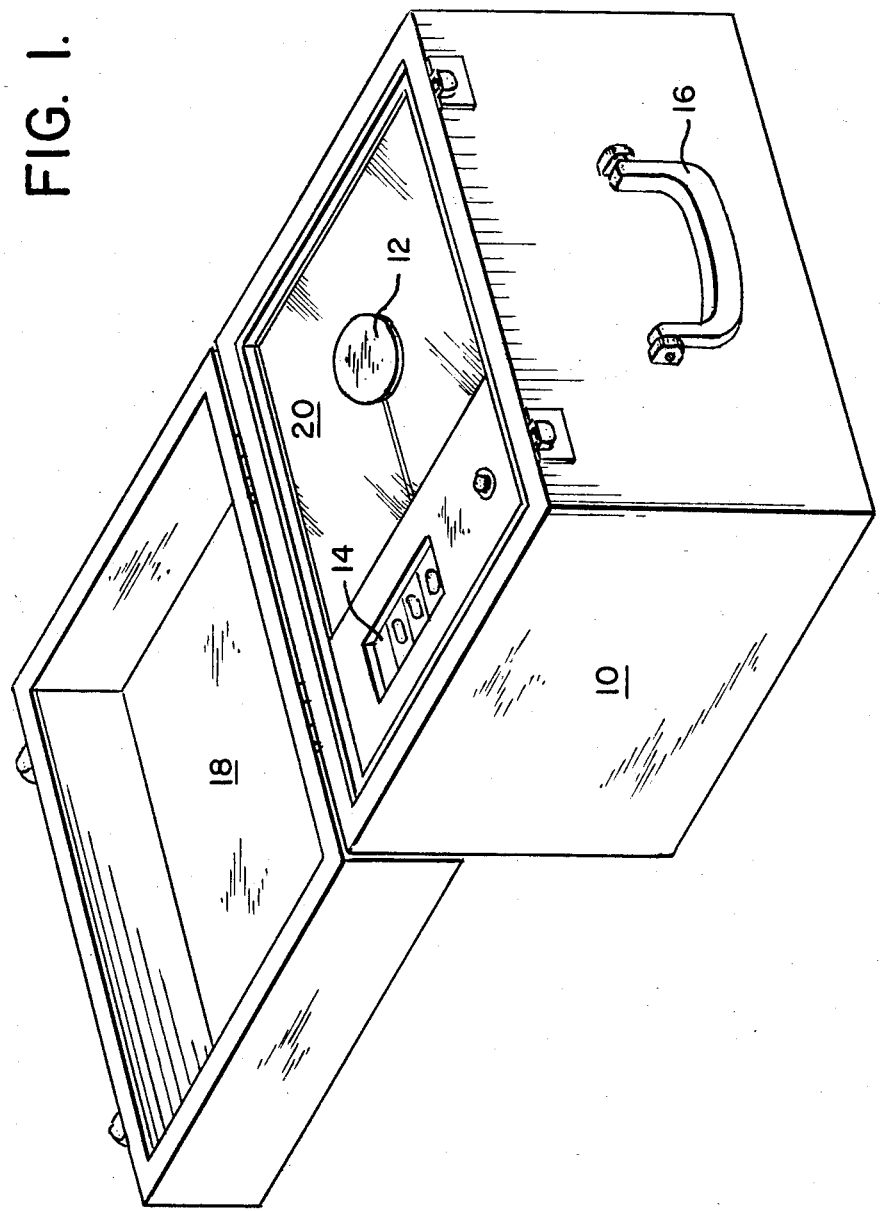
FIG. 1 is an external isometric view of the preferred embodiment.

FIG. 1 shows the entire portable dosimeter unit. It comprises a single box 10 containing a pancake ionization chamber 12 for detecting the radiation to be measured, electronic circuitry for transducing the radiation ionization in the chamber into a representation of the radiation intensity, shown in FIG. 2, and a display device 14 for indicating the representation of the radiation intensity. The entire box of the preferred unit measures only about $8 \times 10 \times 6''$ ($22.4 \times 25.4 \times 15.2$ cm.) and thus is readily transported and positioned with a handle 16. A protective cover 18 is also provided.

FIG. 1 also best shows that the pancake ionization chamber 12 is mounted in a larger plate or phantom 20. As described later with reference to FIG. 2, most of the pancake ionization chamber comprises polystyrene substrates. The phantom 20 is also polystyrene. The single material of the phantom and the ionization chamber eliminates interference with the proper indication of the radiation intensity on the display from variations in the materials about the ionization chamber detector.

The phantom 20 also serves to provide a representation of the radiation intensity at a predetermined depth in the intended target of the radiation. Varying the thickness of the phantom therefore varies the depth of the radiation dose represented on the display. Phantom plates of various thickness (not shown) are placed over the phantom 20 to adapt the dosimeter for indicating the radiation intensity at various depths in polystyrene. This feature furthers the useful versatility of the portable dosimeter unit.

Figure 2:
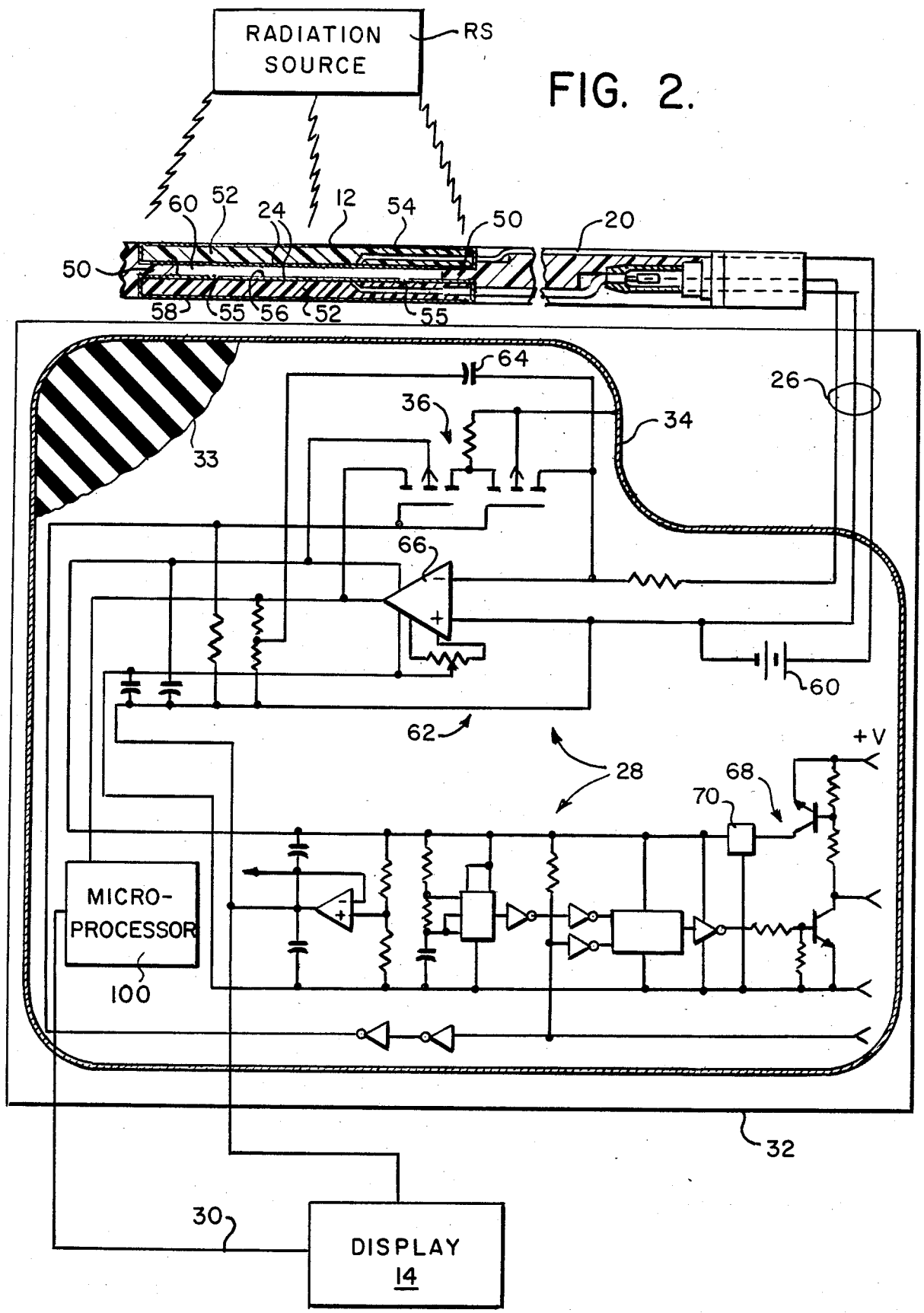
FIG. 2 is a schematic of the preferred embodiment.

FIG. 2 is a schematic of the portable dosimeter unit shown in FIG. 1 in operative position receiving radiation from a radiation source RS. The radiation penetrates the pancake ionization chamber 12 to ionize a gas (air) between two parallel-plate electrodes 24 of the pancake ionization chamber. The negative charges produced are transferred to the electrodes and carried over a coaxial shielded cable 26 to an electronic circuit 28 for converting the charge into a signal representing the intensity of the radiation. The signal representating the radiation intensity is then fed (over a line 30) to the display 14 for indicating the radiation intensity.

Some of the components of the electronic circuitry 28 are sensitive to the ionizing radiation, and electromagnetic interference. In order to assemble the electronic circuitry 28 with the other components of the dosimeter as a portable unit, it is therefore necessary to shield the electronic circuitry 28 from the ionizing radiation and electromagnetic interference.

Radiation shielding is provided by enclosing all of the electronic circuit components, or in other embodiments at least those components which are radiation sensitive, in a lead enclosure 32. The lead absorbs the radiation to shield the enclosed circuitry in the well-known way. The same high atomic weight property which makes lead desirable to radiation shielding also, of course, makes the lead enclosure heavy. It is therefore important to the portability of the dosimeter that the electronic circuitry 28 be as small as possible to be enclosed by the smallest, lightest lead enclosure 32 possible.

To shield the electronic circuitry 28 from electromagnetic intereference, the electronic circuitry is also enclosed by an electrically-conducting shield 34. The electrically conducting shield may be, for example, an aluminum box as illustrated. It is electrically connected to the circuitry 28 via a MOSFET (metal oxide silicon field-effect transistor) coupling 36. The electrical shield picks up the stray electrons or other electromagnetic interference and the MOSFET coupling of the shield to the circuitry carries off any charge from the shield to prevent further, electrostatic interference between the shield and the electronic circuit components.

Some of the radiation, at an intensity below that which would damage the electronic circuit components 28, may penetrate the lead radiation shield 32. Indeed, again with a view to keep the lead shield 32 as light as possible, the lead shield may be designed to have a thickness which shields the electronic circuit components 28 only from radiation which would affect their operation. The level of the radiation within the lead shield 32 may still be sufficient within, however, to ionize any air within the enclosure. The resulting ions could then interfere with the operation of the electronic circuit components 28. To prevent this, the electronic circuit components 28 are potted within the lead shield enclosure 32 in a material 33 such as a high electrical resistance wax, for example Ceros wax.

The three shields surrounding the electronic circuit components thus fully protect the electronic circuit components from radiation-induced interference. Shielding the electronic circuit components from radiation-induced interference allows them to be assembled with the ionization chamber, as a unit, and placed with the ionization chamber, as a unit, in the radiation. The portable dosimeter unit therefore does not require set-up shielding steps and the radiation intensity indicated by the unit is less subject to errors caused by improperly setting up the unit.

In greater detail, the polystyrene phantom 20 has central lugs 50 which space a pair of parallel polystyrene substrates 52 from each other. A graphite coating surrounds all sides of the top substrate to form a top electrode 54 of the electrodes 24, and a similar graphite coating surrounds the lower substrate, except that a narrow gap 55 isolates a collector portion 56 of the other electrode 24 from a guard electrode 58 about the remainder of the substrate. The collector electrode 56 faces a parallel portion of the electrode 54 across the space between the substrates provided by the lugs 50 to define a parallel-electrode ionization chamber between them. An airhole 60 penetrates one of the substrates and graphite electrode coating to avoid pressure differentials between the chamber's cavity and the atmosphere. The volume of the ionization chamber therefore is not changed by pressure differentials. Polystyrene is selected for the phantom and substrate material in part for its temperature stability to minimize the effect of thermal expansion on the volume of the ionization chamber. By precisely defining the volume of the ionization chamber in this way, the pancake ionization chamber does not require radiological calibration.

An electric potential is connected across the leads in cable 26 which are connected to the electrodes 54 and guard electrode 58 to attract the radiation-produced charge in the ionization chamber to the electrode having the opposite charge. An integrating differential amplifier circuit 62 produces and holds on a capacitor 64 a charge which is continuously proportional to the charge collected on the electrodes. For this, the integrating differential amplifier circuit 62 preferably includes a differential operational amplifier 66 of the type designated 515.

The signal from the integrating differential amplifier circuit represents the radiation intensity and may be provided directly to the display 14 in other embodiments. In the preferred embodiment, however, the signal is first passed to a microprocessor 100. The microprocessor is preprogramed with the known algorithm for converting the signal into a signal representing the radiation intensity in radiation measurements units such as rads. Still more preferably, the micropressor is preprogrammed with the various known algorithms for converting the potential signal into radiation measurement units for the various types of high energy particle radiation with which the dosimeter unit is to be used. Selector switches (not shown) are then provided to set the microprocessor for applying the algorithm appropriate to the particular radiation measurement being made.

Transistor switch 68 and timing-circuit devices at 70 automatically shut off the dosimeter after a conventent, preset interval, for example five minutes. This preserves the life of the battery power supply necessary to make the dosimeter portable and facilitates the intended use of the dosimeter by less-skilled technician.

Potential-dividing resistors and a buffer amplifier are the principal components of the battery-driven power supply circuit. It, too, is electron, ion, and radiation shielded in the same way as the other circuit components just described.

The MOSFET devices 36 also function with a manual reset switch (not shown) on a line to discharge capacitor 64 and thus reset display 14 for taking sucessive radiation readings.

Still further variations and modifications of the preferred embodiment as may occur to those skilled in the art are within the scope of the invention defined by the following claims.

What is claimed is:

1. A simple but very accurate portable dosimeter for indicating the intensity of ionizing radiation, comprising, as a unit:
   (a) a radiation-detection chamber having a pair of parallel, facing, electrically-conducting, radiation-permeable electrodes spaced from each other to define a volume for a gas which is ionizable by the radiation when exposed thereto;
   (b) electric potential supply means connected across the electrodes for attracting the gas ions to the electrodes and transferring their charge to the electrodes;
   (c) detection circuit means connected across the electrodes and having at least one of high-frequency electromagnetic- and radiation-sensitive components for detecting the charge on the electrodes and indicating therefrom a representation of the intensity of the radiation;
   (d) radiation shield means surrounding the radiation-sensitive components of the detection circuit means for shielding the latter from the ionizing radiation;
   (e) electric shield means surrounding the sensitive components of the detection circuit means for shielding the latter from electromagnetic interference including any caused by the ionizing radiation; and
   (f) ion shield means potting the ion-sensitive components for shielding them from radiation-caused ambient ionization;
   whereby the entire dosimeter may be assembled as the unit and portably transported into various radiation sources.

2. A portable dosimeter as in claim 1, wherein the radiation shield means comprises a lead enclosure.

3. A portable dosimeter as in claim 1, wherein the electric shield means comprises an electrically conducting enclosure electrically connected to the detection circuit means for draining any charge therefrom.

4. A portable dosimeter as in claim 1, wherein the shield means comprises potting the ion sensitive components of the detector circuit means in appropriate wax.

5. A portable dosimeter as in claim 1, wherein the detector circuit means further comprises signal processor means for converting the electron charge on the electrodes into a representation of the radiation in radiation measurement units.

6. A portable dosimeter as in claim 5, wherein the radiation shield means comprises a lead enclosure.

7. A portable dosimeter as in claim 5, wherein the electric shield means comprises an electrically conducting enclosure electrically connected to the detection circuit means for draining any charge therefrom.

8. A portable dosimeter as in claim 5, wherein the ion shield means comprises potting the ion sensitive components of the detector circuit means in appropriate wax.

* * * * *

UNITED STATES PATENT AND TRADEMARK OFFICE
CERTIFICATE OF CORRECTION

PATENT NO. : 4,596,932

DATED : June 24, 1986

INVENTOR(S) : ALFONSO BUFFA, RICHARD CALEY, KARL PFAFF

It is certified that error appears in the above-identified patent and that said Letters Patent is hereby corrected as shown below:

Name of Assignee: change "Allied Memorial Hospital for Cancer & Diseases" to --Memorial Hospital for Cancer & Allied Diseases--.

In the Abstract, line 7, change "partability" to --portability--.

In column 2, lines 1 and 2, change "periodical radiological recalibrating a dosimeter" to --periodic radiological recalibration of a dosimeter--.

In column 5, line 53, change "conventent" to --convenient--; and

Line 57, change "technician" to --technicians--.

Signed and Sealed this

Fifteenth Day of September, 1987

Attest:

DONALD J. QUIGG

*Attesting Officer*  *Commissioner of Patents and Trademarks*